(12) United States Patent
Nye et al.

(10) Patent No.: US 8,516,803 B2
(45) Date of Patent: Aug. 27, 2013

(54) MECHANICAL VACUUM PUMP INTEGRATED WITH COUPLED SECONDARY AIR INJECTION VALVE

(75) Inventors: Gary L. Nye, Macomb, MI (US); Robert Lionel Jacques, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 520 days.

(21) Appl. No.: 12/890,780

(22) Filed: Sep. 27, 2010

(65) Prior Publication Data

US 2011/0280746 A1 Nov. 17, 2011

Related U.S. Application Data

(60) Provisional application No. 61/345,381, filed on May 17, 2010.

(51) Int. Cl.
*F01N 3/34* (2006.01)
*F01N 13/18* (2010.01)

(52) U.S. Cl.
USPC .............................................. 60/293; 60/304

(58) Field of Classification Search
USPC .................. 417/279, 231; 60/289, 290, 291, 60/292, 293, 304; 123/531, 532, 533, 534, 123/585, 586, 587, 588, 568.28
See application file for complete search history.

(56) References Cited

U.S. PATENT DOCUMENTS

| | | | | |
|---|---|---|---|---|
| 2,217,241 A | * | 10/1940 | Tendler | 60/305 |
| 2,263,318 A | * | 11/1941 | Tifft | 60/306 |
| 3,034,290 A | * | 5/1962 | Gary | 60/289 |
| 3,082,597 A | * | 3/1963 | Hamblin | 60/307 |
| 3,213,608 A | * | 10/1965 | Littell | 60/274 |
| 3,522,702 A | * | 8/1970 | Grosseau | 60/305 |
| 3,942,321 A | | 3/1976 | Eckhardt et al. | |
| 3,943,413 A | | 3/1976 | Keever | |
| 4,084,373 A | * | 4/1978 | Hashimoto et al. | 60/293 |
| 4,156,416 A | | 5/1979 | Weisgerber et al. | |
| 4,458,641 A | | 7/1984 | Wickramasuriya | |
| 4,856,468 A | | 8/1989 | Speil et al. | |
| 5,049,770 A | * | 9/1991 | Gaeth et al. | 310/89 |
| 5,177,958 A | * | 1/1993 | Clemens et al. | 60/293 |
| 5,755,095 A | * | 5/1998 | Maurer | 60/307 |
| 5,839,401 A | | 11/1998 | Gruber et al. | |
| 6,014,860 A | | 1/2000 | Schenk et al. | |
| 6,167,699 B1 | | 1/2001 | Johnston et al. | |
| 6,189,318 B1 | | 2/2001 | Valisko | |

\* cited by examiner

*Primary Examiner* — Devon Kramer
*Assistant Examiner* — Nathan Zollinger
(74) *Attorney, Agent, or Firm* — Quinn Law Group, PLLC

(57) ABSTRACT

A mechanical vacuum pump for an engine includes a flange configured for attachment to a cylinder head of the engine. The flange defines a bore, which is configured for interconnecting an injection air inlet in the cylinder head with an injection air outlet of a secondary air injection valve. The secondary air injection valve is directly mounted to the mechanical vacuum pump, thereby indirectly mounting the secondary air injection valve to the cylinder head of the engine, with the bore communicating fresh air from the secondary air injection valve to the cylinder head.

13 Claims, 3 Drawing Sheets

MECHANICAL VACUUM PUMP INTEGRATED WITH COUPLED SECONDARY AIR INJECTION VALVE

CROSS-REFERENCE TO RELATED APPLICATIONS

This application claims the benefit if U.S. Provisional Patent Application Ser. No. 61/345,381, filed on May 17, 2010, the disclosure of which is hereby incorporated by reference.

TECHNICAL FIELD

The invention generally relates to an internal combustion engine for a vehicle, and more specifically to a mechanical vacuum pump for the engine. The invention further provides a method of assembling the engine.

BACKGROUND

Vehicles including internal combustion engines may include a mechanically driven vacuum pump. The mechanical vacuum pump is driven by the engine, and produces a vacuum. The vacuum is used to operate various components of the vehicle. The vehicle may further include a secondary air injection valve. The secondary air injection valve provides a flow of fresh air to the cylinder head, which is injected into the exhaust gas of the engine to improve emissions.

In some engines packaging constraints limit the available space in which the mechanical vacuum pump and/or the secondary air injection valve may be mounted to the engine, and particularly to the cylinder head.

SUMMARY

An engine assembly for a vehicle is provided. The engine assembly includes a cylinder head defining an injection air inlet, and a mechanical vacuum pump mounted to the cylinder head. The mechanical vacuum pump is configured for producing a vacuum. The engine assembly further includes a secondary air injection valve mounted to the mechanical vacuum pump. The secondary air injection valve defines an injection air outlet. The secondary air injection valve is configured for injecting fresh air through the injection air outlet. The mechanical vacuum pump defines a bore. The bore interconnects the injection air inlet of the cylinder head and the injection air outlet of the secondary air injection valve in fluid communication with each other.

A mechanical vacuum pump for an engine is also provided. The mechanical vacuum pump includes a flange configured for attachment to a cylinder head. The mechanical vacuum pump further includes a pump mechanism attached to the flange. The pump mechanism is configured for producing a vacuum. The flange defines a bore extending therethrough. The bore is configured for interconnecting an injection air inlet in the cylinder head with an injection air outlet of a secondary air injection valve in fluid communication. The bore is further configured for attaching the secondary air injection valve to the flange such that a flow of fresh air from the secondary air injection valve flows through the flange and into the cylinder head.

A method of assembling an engine is also provided. The method includes attaching a mechanical vacuum pump to a cylinder head of the engine with a first fastener. The mechanical vacuum pump is attached such that a bore in the mechanical vacuum pump aligns with an injection air inlet in the cylinder head. The method further includes mounting a secondary air injection valve to the mechanical vacuum pump, such that an injection air outlet of the secondary air injection valve aligns with the bore in the mechanical vacuum pump. Aligning the injection air outlet of the secondary air injection valve with the bore in the mechanical vacuum pump allows fresh air to flow from the secondary air injection valve, through the injection air outlet and the bore, and into the injection air inlet of the cylinder head.

Accordingly, the bore in the flange of the mechanical vacuum pump allows the secondary air injection valve to be indirectly mounted to the cylinder head through the mechanical vacuum pump. This reduces the packaging constraints associated with mounting the mechanical vacuum pump and the secondary air injection valve to an engine. The fresh air from the secondary air injection valve flows through the bore in the flange of the mechanical vacuum pump and then into the cylinder head. The bore has no effect on the mounting and/or operation of the mechanical vacuum pump. Accordingly, if the vehicle does not include the secondary air injection valve, the bore merely abuts an outer surface of the cylinder head and serves no purpose. This arrangement allows the mechanical vacuum pump to be used with or without the secondary air injection valve, which simplifies assembly of the engine.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, an engine assembly is shown generally at 20. The engine assembly 20 is for a vehicle, and may include an internal combustion engine, such as but not limited to a gasoline engine.

The engine assembly 20 includes an engine block (not shown). The engine block may define any suitable number of cylinder bores, including, but not limited to an engine block defining four cylinder bores. The engine block may include any suitable configuration, including but not limited to, an inline configuration or a V-shaped configuration.

Figure 1:
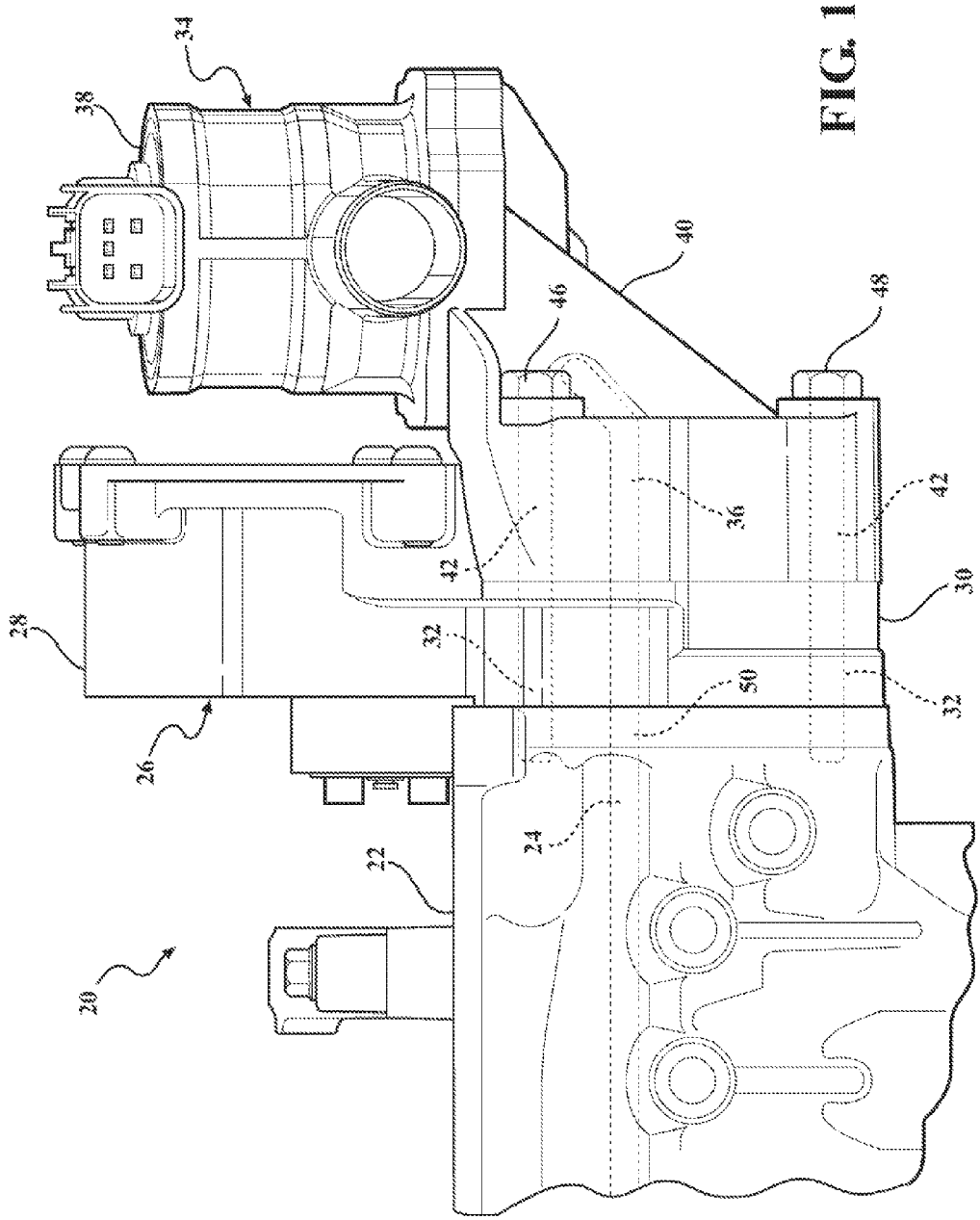
FIG. 1 is a fragmentary schematic side view of an engine showing a mechanical vacuum pump and a secondary air injection valve attached to a cylinder head.

Referring to FIG. 1, the engine assembly 20 further includes a cylinder head 22. The cylinder head 22 is attached to the engine block. The cylinder head 22 defines an injection air inlet 24. The injection air inlet 24 is in fluid communication with each of a plurality of exhaust ports defined by the cylinder head 22. The injection air inlet 24 communicates a flow of fresh air to a flow of exhaust gas to improve emissions of the vehicle.

A mechanical vacuum pump 26 is mounted to the cylinder head 22. The mechanical vacuum pump 26 includes a pump mechanism 28 operably driven by the engine and configured for producing a vacuum. The mechanical vacuum pump 26 includes a flange 30, with the pump mechanism 28 attached to and extending from the flange 30. The vehicle uses the vacuum produced by the mechanical vacuum pump 26 to operate various components and/or features of the vehicle. The pump mechanism 28 may be sized and or configured in any suitable manner to meet the requirements of the vehicle. Additionally, the pump mechanism 28 may include any suitable mechanism capable of producing a vacuum sufficient to meet the requirements of the vehicle.

Figure 3:
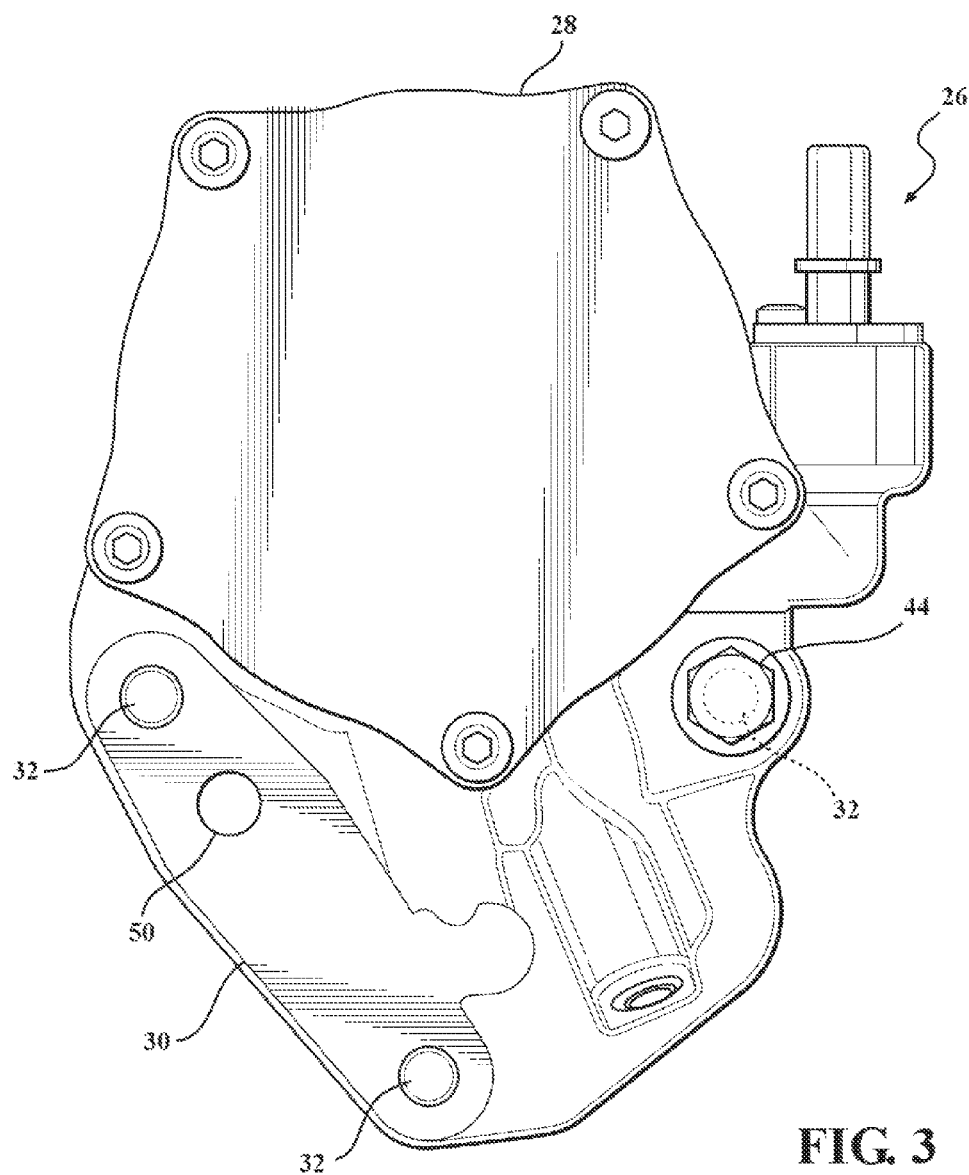
FIG. 3 is a schematic end view of the mechanical vacuum pump.

Referring to FIGS. 1 and 3, the mechanical vacuum pump 26 defines at least one pump fastener passage 32 extending therethrough. More specifically, the flange 30 defines the at least one pump fastener passage 32. As shown, the at least one pump fastener passage 32 includes three pump fastener passages 32. However, it should be appreciated that the at least one pump fastener passage 32 may include any number of pump fastener passages 32 necessary to meet the specific design requirements of the mechanical vacuum pump 26.

Figure 2:
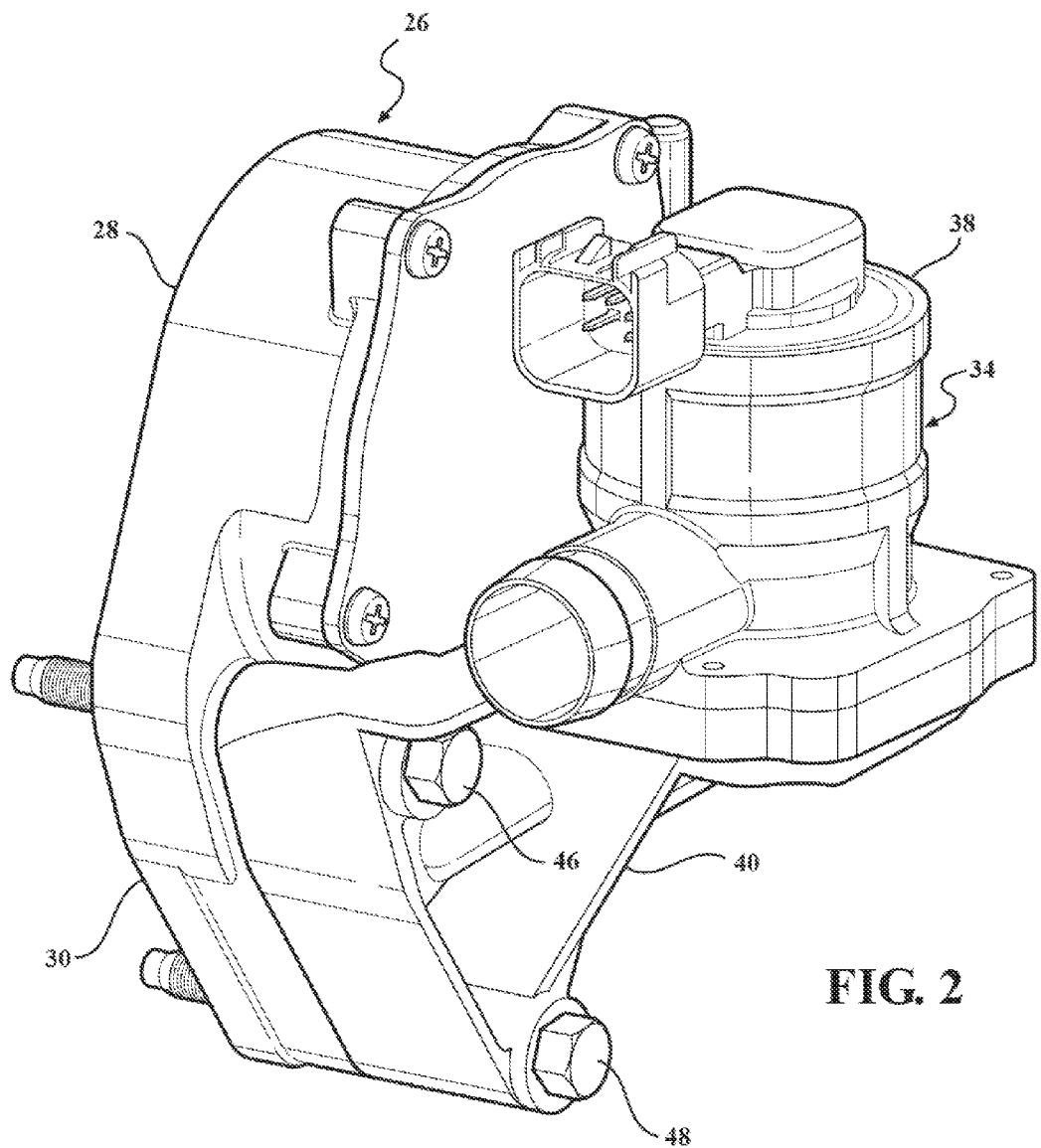
FIG. 2 is a schematic perspective view of the mechanical vacuum pump and the air injection valve.

Referring to FIGS. 1 and 2, a secondary air injection valve 34 is mounted to the mechanical vacuum pump 26. The secondary air injection valve 34 defines an injection air outlet 36. The secondary air injection valve 34 includes a valve mechanism 38 that is configured for controlling the flow of fresh air through the injection air outlet 36. The secondary air injection valve 34 includes a bracket 40, which is mounted to the flange 30 of the mechanical vacuum pump 26. The valve mechanism 38 is mounted to and supported by the bracket 40. Additionally, the bracket 40 defines the injection air outlet 36. The valve mechanism 38 may be sized and or configured in any suitable manner to meet the requirements of the vehicle. Additionally, the valve mechanism 38 may include any suitable mechanism capable of controlling the flow of fresh air to the cylinder head 22.

Referring to FIG. 1, the secondary air injection valve 34 defines at least one valve fastener passage 42 extending therethrough. More specifically, the bracket 40 defines the at least one valve fastener passage 42. Each of the at least one valve fastener passages 42 is coaxially aligned with one of the at least one pump fastener passages 32. However, if more pump fastener passages 32 exist than valve fastener passages 42, then each of the pump fastener passages 32 may not be aligned with one of the valve fastener passages 42. As shown, the at least one valve fastener passage 42 includes two valve fastener passages 42. However, it should be appreciated that the at least one valve fastener passage 42 may include any number of valve fastener passages 42 necessary to meet the specific design requirements of the secondary air injection valve 34.

One of a plurality of fasteners extend through each of the at least one pump fastener passages 32 and the at least one valve fastener passages 42 into threaded engagement with the cylinder head 22. Because the valve fastener passages 42 are aligned with one of the pump fastener passages 32, a single fastener extends through each of the aligned pairs of pump fastener passages 32 and valve fastener passages 42. As shown, a first fastener 44, shown in FIG. 3, extends through one of the pump fastener passages 32 that is not aligned with one of the valve fastener passages 42. Referring to FIG. 2, a second fastener 46 and a third fastener 48 each extend through one aligned pair of the valve fastener passages 42 and the pump fastener passages 32 respectively. In such a manner, the first fastener 44 may attach the mechanical vacuum pump 26 to the cylinder head 22. After which, the second fastener 46 and the third fastener 48 may attach the secondary air injection valve 34 to the mechanical vacuum pump 26. The fastener may include any suitable type of fastener, including but not limited to a bolt.

Referring to FIGS. 1 and 3, the mechanical vacuum pump 26 defines a bore 50. The bore 50 interconnects the injection air inlet 24 of the cylinder head 22 and the injection air outlet 36 of the secondary air injection valve 34 in fluid communication. More specifically, the flange 30 defines the bore 50. The bore 50 allows for fluid communication, i.e., fresh air communication, between the secondary air injection valve 34 and the cylinder head 22 of the engine. The mechanical vacuum pump 26 is disposed between the cylinder head 22 and the secondary air injection valve 34. Accordingly, the mechanical vacuum pump 26 at least partially supports the secondary air injection valve 34 relative to the cylinder head 22. Accordingly, the bore 50 allows the secondary air injection valve 34 to be indirectly mounted to the cylinder head 22 via the mechanical vacuum pump 26. Mounting the secondary air injection valve 34 to the mechanical vacuum pump 26, and using the bore 50 to communicate the fresh air between the secondary air injection valve 34 and the cylinder head 22, reduces the cylinder head 22 surface area required for mounting both the mechanical vacuum pump 26 and the secondary air injection valve 34.

A seal (not shown), including but not limited to a gasket, may be disposed about the bore 50, between the cylinder head 22 and the flange 30 of the mechanical vacuum pump 26, and/or the flange 30 of the mechanical vacuum pump 26 and the bracket 40 of the secondary air injection valve 34. The seal prevents fluid leakage from the bore 50 between the cylinder head 22 and the flange 30 and/or the flange 30 and the bracket 40.

A method of assembling the engine is also provided. The method includes attaching the mechanical vacuum pump 26 to the cylinder head 22 of the engine with the first fastener 44 such that the bore 50 in the mechanical vacuum pump 26 is aligned with the injection air inlet 24 in the cylinder head 22. The method further includes mounting the secondary air injection valve 34 to the mechanical vacuum pump 26 such that the injection air outlet 36 of the secondary air injection valve 34 aligns with the bore 50 in the mechanical vacuum pump 26. Having the injection air outlet 36 aligned with the bore 50 allows the flow of fresh air from the secondary air injection valve 34, through the injection air outlet 36 and the bore 50, and into the injection air inlet 24 of the cylinder head 22.

Mounting the secondary air injection valve 34 to the mechanical vacuum pump 26 may further be defined as mounting the secondary air injection valve 34 to the mechanical vacuum pump 26 such that the mechanical vacuum pump 26 is disposed between the cylinder head 22 and the secondary air injection valve 34, with the mechanical vacuum pump 26 at least partially supporting the secondary air injection valve 34.

Mounting the secondary air injection valve 34 to the mechanical vacuum pump 26 may include inserting the fastener through each of the valve fastener passages 42 defined by the secondary air injection valve 34, and the pump fastener passages 32 defined by the mechanical vacuum pump 26. Each of the fasteners is inserted through the valve fastener passages 42 and the pump fastener passages 32 into threaded engagement with the cylinder head 22.

While the best modes for carrying out the invention have been described in detail, those familiar with the art to which this invention relates will recognize various alternative designs and embodiments for practicing the invention within the scope of the appended claims.

The invention claimed is:

1. An engine assembly for a vehicle, the engine assembly comprising:

a cylinder head defining an injection air inlet;

a mechanical vacuum pump mounted to the cylinder head and configured for producing a vacuum; and a secondary air injection valve mounted to the mechanical vacuum pump and defining an injection air outlet, wherein the secondary air injection valve is configured for injecting fresh air through the injection air outlet;

wherein the mechanical vacuum pump defines a bore interconnecting the injection air inlet of the cylinder head and the injection air outlet of the secondary air injection valve in fluid communication with each other;

the engine assembly further comprising a fastener extending through the secondary air injection valve and the mechanical vacuum pump into threaded engagement with the cylinder head.

2. An engine assembly as set forth in claim 1 wherein the mechanical vacuum pump is disposed between the cylinder head and the secondary air injection valve.

3. An engine assembly as set forth in claim 2 wherein the mechanical vacuum pump at least partially supports the secondary air injection valve relative to the cylinder head.

4. An engine assembly as set forth in claim 3 wherein the mechanical vacuum pump defines at least one pump fastener passage extending therethrough and the secondary air injection valve defines at least one valve fastener passage extending therethrough, with each of the at least one valve fastener passages coaxially aligned with one of the at least one pump fastener passages.

5. An engine assembly as set forth in claim 4 wherein the at least one pump fastener passage includes three pump fastener passages and the at least one valve fastener passage includes two valve fastener passages.

6. An engine assembly as set forth in claim 4 wherein the mechanical vacuum pump includes a flange defining the bore and the at least one pump fastener passage.

7. An engine assembly as set forth in claim 6 wherein the secondary air injection valve includes a bracket defining the air injecting outlet and the at least one valve fastener passage, wherein the bracket of the secondary air injection valve is mounted to the flange of the mechanical vacuum pump.

8. An engine assembly as set forth in claim 7 wherein the mechanical vacuum pump includes a pump mechanism attached to and extending from the flange.

9. An engine assembly as set forth in claim 8 wherein the secondary air injection valve includes a valve mechanism attached to and supported by the bracket.

10. A mechanical vacuum pump for an engine, the mechanical vacuum pump comprising:

a flange configured for attachment to a cylinder head; and a pump mechanism attached to the flange and configured for producing a vacuum;

wherein the flange defines a bore extending therethrough and configured for interconnecting an injection air inlet in the cylinder head in fluid communication with an injection air outlet of a secondary air injection valve, and attaching the secondary air injection valve to the flange such that a flow of fresh air from the secondary air injection valve flows through the flange and into the cylinder head;

wherein the pump mechanism is disposed between the cylinder head and the air injection valve.

11. A mechanical vacuum pump as set forth in claim 10 further comprising at least one pump fastener passage extending through the flange, wherein the at least one pump fastener passage is separate and distinct from the bore.

12. A method of assembling an engine, the method comprising:

attaching a mechanical vacuum pump to a cylinder head of the engine with a first fastener such that a bore in the mechanical vacuum pump aligns with an injection air inlet in the cylinder head;

mounting a secondary air injection valve to the mechanical vacuum pump such that an injection air outlet of the secondary air injection valve aligns with the bore in the mechanical vacuum pump, such that fresh air may flow from the secondary air injection valve, through the injection air outlet and the bore, and into the injection air inlet of the cylinder head;

wherein mounting a secondary air injection valve to the mechanical vacuum pump includes inserting a combined fastener through a valve fastener passage defined by the secondary air injection valve and a pump fastener passage defined by the mechanical vacuum pump into threaded engagement with the cylinder head.

13. A method as set forth in claim 12 wherein mounting a secondary air injection valve to the mechanical vacuum pump is further defined as mounting a secondary air injection valve to the mechanical vacuum pump such that the mechanical vacuum pump is disposed between the cylinder head and the secondary air injection valve, with the mechanical vacuum pump at least partially supporting the secondary air injection valve.

* * * * *